(12) United States Patent
Yang et al.

(10) Patent No.: US 12,489,727 B2
(45) Date of Patent: Dec. 2, 2025

(54) SINGLE WIRE SERIAL COMMUNICATION METHOD AND SINGLE WIRE SERIAL COMMUNICATION SYSTEM

(71) Applicant: Silergy Semiconductor Technology (Hangzhou) LTD, Hangzhou (CN)

(72) Inventors: Yuanyu Yang, Hangzhou (CN); Xiaoqiang Xu, Hangzhou (CN); Jianxin Wang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 84 days.

(21) Appl. No.: 18/619,894

(22) Filed: Mar. 28, 2024

(65) Prior Publication Data
US 2024/0333677 A1    Oct. 3, 2024

(30) Foreign Application Priority Data

Mar. 31, 2023  (CN) .......................... 202310345328.6

(51) Int. Cl.
*H04L 61/3015*     (2022.01)
*H04L 45/64*       (2022.01)

(52) U.S. Cl.
CPC .......... *H04L 61/3015* (2013.01); *H04L 45/64* (2013.01)

(58) Field of Classification Search
CPC ... H04L 61/3015; H04L 45/64; H04L 12/403; Y02D 10/00; G06F 13/4282; G06F 2213/0002
USPC .......................................................... 709/245
See application file for complete search history.

(56) References Cited

U.S. PATENT DOCUMENTS

| | | | |
|---|---|---|---|
| 5,864,872 A * | 1/1999 | Lee ........................ | G06F 3/0383 711/115 |
| 10,356,824 B2 | 7/2019 | Qiao et al. | |
| 2016/0239449 A1* | 8/2016 | Hapke ................. | G06F 13/4068 |
| 2022/0253398 A1* | 8/2022 | Hyakudai ........... | G06F 13/4282 |
| 2023/0179668 A1 | 6/2023 | Lin et al. | |
| 2023/0229608 A1* | 7/2023 | Mathur ................. | G06F 3/0233 345/168 |

FOREIGN PATENT DOCUMENTS

| | | | |
|---|---|---|---|
| CN | 115658585 A | * | 1/2023 |
| CN | 115664889 A | * | 1/2023 |

* cited by examiner

*Primary Examiner* — Wing F Chan
*Assistant Examiner* — John Fan

(57) ABSTRACT

A single wire serial communication method for a system having a master device and a plurality of slave devices sequentially connected by a single wire can include: in each communication, transmitting a data packet by the master device, and sequentially receiving the data packet by each of the slave devices; receiving the data packet and forwarding the data packet to a next slave device by a current slave device, where each of the plurality of slave devices when receiving the data packet serve as the current slave device; modifying device address data in the data packet by the current slave device; and comparing the device address data in the data packet received by the current slave device against a preset data or the device address data in the data packet transmitted by the master device, in order to find at least one target slave device in the communication.

20 Claims, 7 Drawing Sheets

SINGLE WIRE SERIAL COMMUNICATION METHOD AND SINGLE WIRE SERIAL COMMUNICATION SYSTEM

RELATED APPLICATIONS

This application claims the benefit of Chinese Patent Application No. 202310345328.6, filed on Mar. 31, 2023, which is incorporated herein by reference in its entirety.

FIELD OF THE INVENTION

The present invention generally relates to the field of communications, and more particularly to single wire serial communication methods and systems.

BACKGROUND

In modern technology, communication is vital function among different equipment. Currently, main communication is wired communication and/or wireless communication. Traditional wired communication can be serial communication and/or parallel communication. Serial communication may be applied to long-distance communication, and the parallel communication applied to short-distance communication. Single-wire communication may serve as one of the serial communication types, with advantages of fewer pins and wiring resources.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
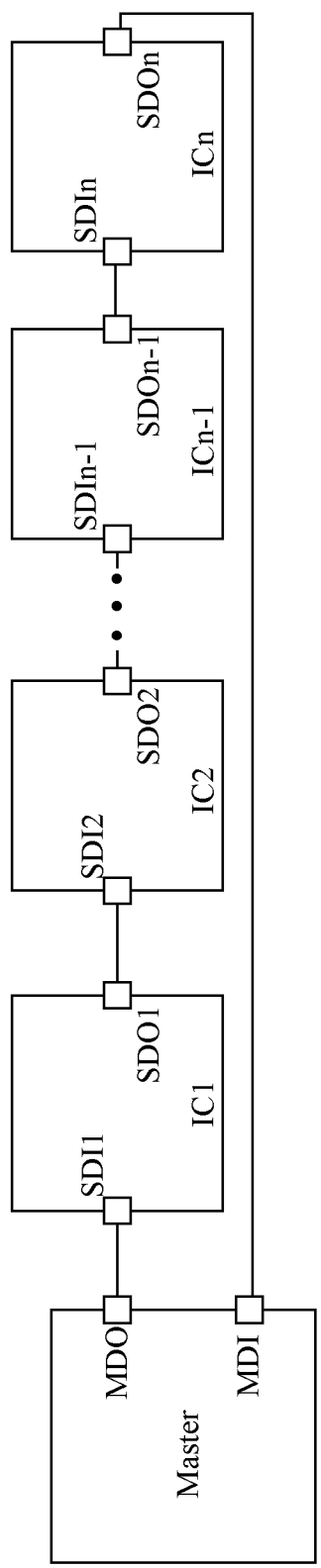
FIG. 1 is a schematic block diagram of an example single wire serial communication system.

Referring now to FIG. 1, shown is a schematic block diagram of an example single wire serial communication system. In this single wire cascade communication example, IC1 to ICn are equal apparatuses, and a master device and slave devices IC1 to ICn may form a communication link. In order to distinguish slave devices serial connected on different positions of the communication link, address initialization can be performed on the slave devices. In some approaches, after the master device transmits an address initialization command and the slave device IC1 stores the received device address, slave device IC1 can add 1 to the value of its received device address, and transmit the incremented device address to slave device IC2. Next, slave device IC2 stores its received device address, slave device IC2 adds 1 to its received device address and transmits the incremented device address to slave device IC3, and so on, until the address initialization finishes. After the address initialization finishes, slave devices IC1 to ICn can store their device addresses corresponding to the positions on the communication link. After, the master device may communicate normally with slave devices IC1 to ICn according to the device addresses of the slave devices IC1 to ICn. However, if this approach of the address initialization is used and the communication is obstructed during the address initialization, the address initialization can fail, and all subsequent communication accordingly influenced.

Figure 2:
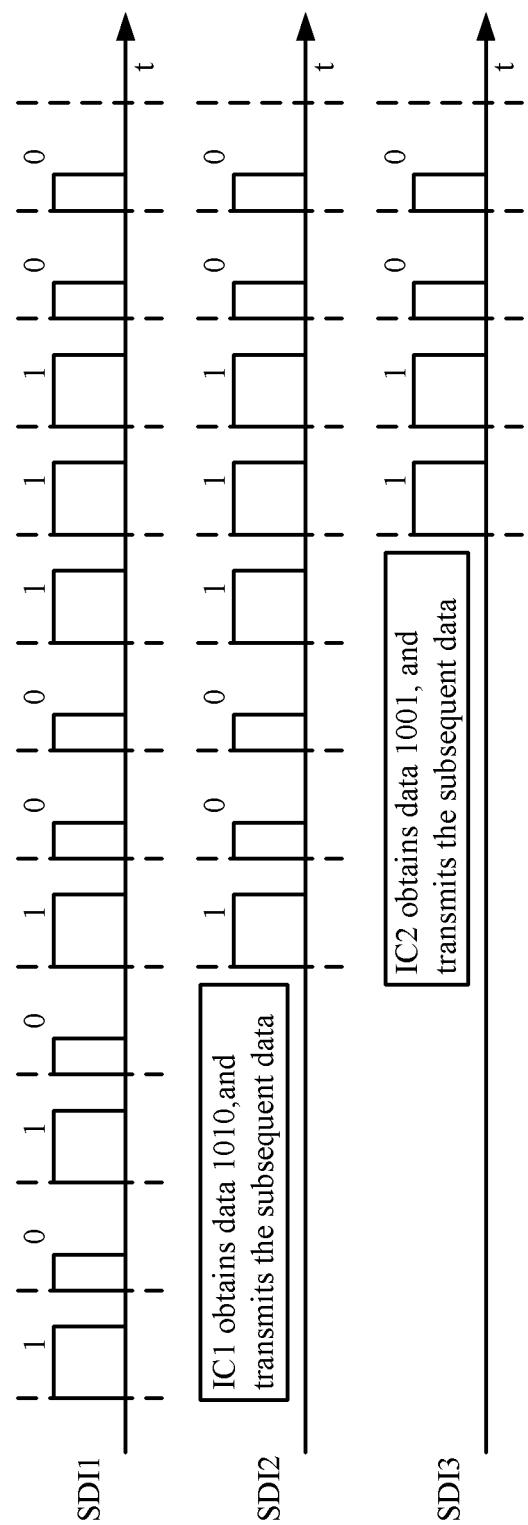
FIG. 2 is a waveform diagram of an example communication method without performing address initialization.

Referring now to FIG. 2, shown is a waveform diagram of an example communication method without performing address initialization. If the address initialization is not performed, the master device may need to sequentially package the data of the all slave devices to transmit the packaged data at once no matter whether the master device needs to communicate with one slave device or the master device needs to communicate with a plurality of slave devices at the same time. After slave device IC1 obtains the data, slave device IC1 can transmit the subsequent data to slave device IC2, and so on. This approach may require transmitting the data of all slave devices on the communication link, which can lower the communication efficiency.

In particular embodiments, the single wire serial communication system can include a master device (Master) and a plurality of slave devices including a first slave device IC1 to an nth slave device ICn, where "n" is a positive integer. The master device and a first slave device IC1 to an nth slave device ICn can be sequentially connected by a single wire to form a communication link. The single wire serial communication system in this example may not be required to perform address initialization on slave device IC1 to nth slave device ICn. When the single wire serial communication system is in a first type communication mode, the master device can find one target slave device in each communication. When the single wire serial communication system is in the first type communication mode, in each communication, the master device can transmit a data packet, and each of the plurality of slave devices IC1-ICn may sequentially receive the data packet.

A current slave device may receive the data packet and forward the data packet to a next slave device in the communication link, where each of the slave devices IC1-

ICn when receiving the data packet may serve as the current slave device. The current slave device can modify the device address data in the data packet before the data packet is forwarded to the next slave device. Also, the current slave device can compare the device address data in the data packet received by the current slave device against a preset data "m" in order to find the one target slave device in the communication. When the device address data in the data packet received by the current slave device matches preset data m, the current slave device can be regarded as the target slave device in the communication and may implement corresponding operations according to communication data in the data packet.

For example, the master device may transmit a data packet, and slave device IC1 to nth slave device ICn can sequentially receive the data packet. Slave device IC1 to the (n−1)th slave device ICn−1 can sequentially forward the data packet to its next slave device (e.g., slave device IC2 to nth slave device ICn) in the communication link. Before one of slave device IC1 to the (n−1)th slave device ICn−1 forwards the data packet to its next slave device, the one of slave device IC1 to the (n−1)th slave device ICn−1 can modify the device address data in the data packet received by the one of slave device IC1 to the (n−1)th slave device ICn−1. The one of slave device IC1 to the (n−1)th slave device ICn−1 can compare the device address data in the received data packet against preset data m. When the device address data in the received data packet in the slave device matches the preset data m, the slave device may be regarded as the target slave device in the communication and can implement corresponding operation(s) according to communication data in the data packet. Slave device IC1 to nth slave device ICn herein can be instances of the same apparatus. For example, the preset data m is determined by the slave device, and the preset data m in the slave device can be set as a fixed value. As such, the preset data m in each of slave device IC1 to nth slave device ICn can be the same in this particular example. However, preset data m is can be different in each slave device in other examples.

In this example single wire serial communication system, data output terminal MDO of the master device can connect to data receiving terminal SDI1 of slave device IC1. Also, data receiving terminal SDI2 of slave device IC2 to data receiving terminal SDIn of nth slave device ICn may respectively be connected to data output terminal SDO1 of slave device IC1 to data output terminal SDOn−1 of the (n−1)th slave device ICn−1 in the communication link. Further, data output terminal SDOn of nth slave device ICn can connect to the data input terminal MDI of the master device, thereby forming a circular single wire serial communication system.

Because the single wire serial communication system in particular embodiments may not perform address initialization on slave device IC1 to nth slave device ICn, in order to distinguish slave device IC1 to nth slave device ICn, the following can be done. When the preset data m and the calculation method of modifying the device address data in the data packet are determined, the device address data in the data packet transmitted by the master device can be set such that the device address data in the data packet transmitted by the master device corresponds to each of slave device IC1 to nth slave device ICn, thus finding the one target slave device in each communication.

Figure 3:
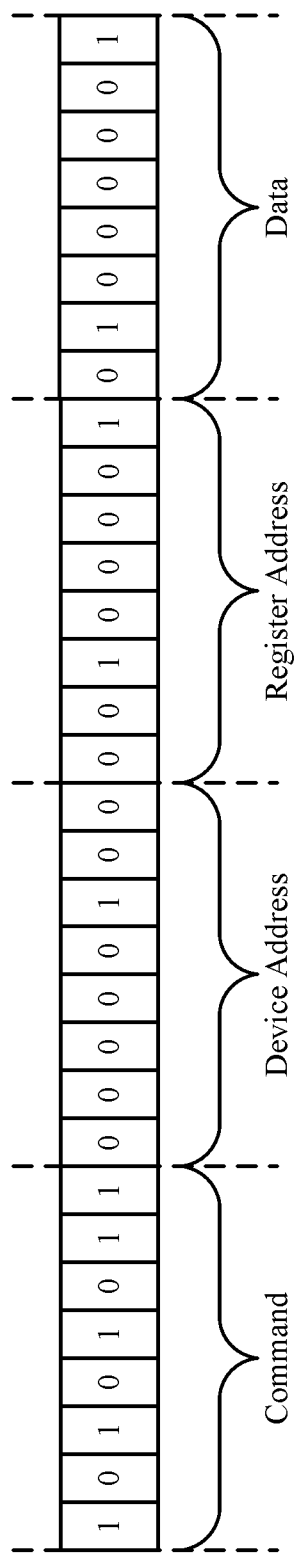
FIG. 3 is a coding diagram of a first example communication protocol used in a single wire serial communication system, in accordance with embodiments of the present invention.

Referring now to FIG. 3, shown is a coding diagram of a first example communication protocol used in a single wire serial communication system, in accordance with embodiments of the present invention. In this particular example, the data packet transmitted by the master device can include command data, device address data, register address data, and communication data "Data." During the process of forwarding the data packet, the slave device can address by modifying the device address data in the data packet, in order to match the target slave device. Thus, the target slave device can implement a corresponding operation according to the communication data in the data packet.

Figure 4:
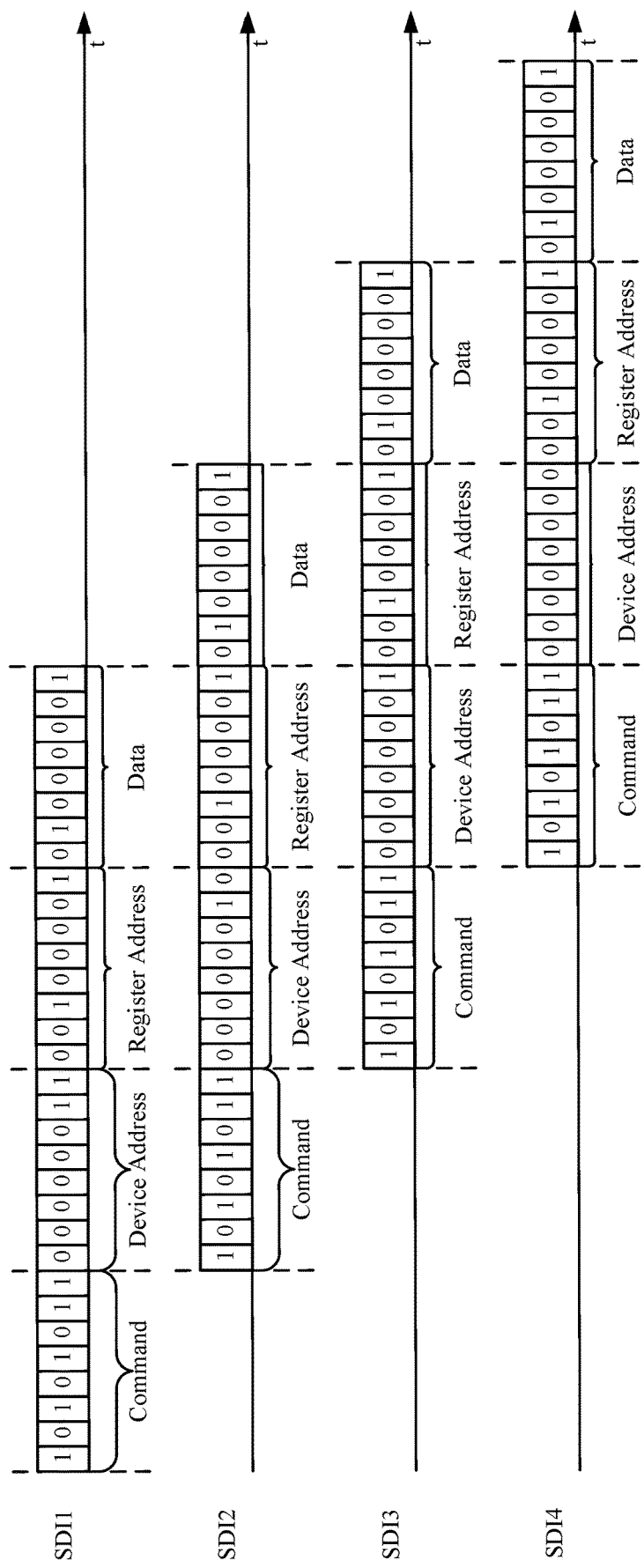
FIG. 4 is a schematic diagram of a second example communication data transmission method of a single wire serial communication system, in accordance with embodiments of the present invention.

Referring now to FIG. 4, shown is a schematic diagram of a second example communication data transmission method of a single wire serial communication system, in accordance with embodiments of the present invention. In this particular example, after the master device transmits the data packet, data receiving terminal SDI1 of slave device IC1 may receive the data packet transmitted by the master device, and slave device IC1 can compare the device address data in the received data packet against the preset data m, and modify the device address data in the received data packet in a preset manner. Slave device IC1 can modify or not modify the other data (e.g., the command data, the register address data, and/or the communication data) in the received data packet when modifying the device address data in the received data packet. If the device address data received by slave device IC1 matches the preset data m, slave device IC1 can determine that the data packet transmitted by the master device is for slave device IC1, and may implement corresponding operation(s) according to the communication data in the received data packet. In this way, the target slave device may be found in this communication.

In addition, slave device IC1 can transmit the data packet with the modified device address data from data output terminal SDO1 to data receiving terminal SDI2 of slave device IC2. Data receiving terminal SDI2 of slave device IC2 may receive the data packet forwarded by slave device IC1, and slave device IC2 can compare the device address data in the received data packet against the preset data m, and may modify the device address data in the received data packet by a preset manner. Slave device IC2 can modify or not modify the other data in the received data packet when modifying the device address data in the received data packet. If the device address data received by slave device IC2 matches the preset data m, slave device IC2 can determine that the data packet transmitted by the master device is for slave device IC2, and may implement corresponding operation(s) according to the communication data in the received data packet. In this way, the target slave device may be found in this communication. Further, slave device IC2 can transmit the data packet with the modified device address data from data output terminal SDO2 to data receiving terminal SDI3 of slave device IC3, and so on.

In one example, the modifying of the device address data by each of slave device IC1 to nth slave device ICn is decreasing the device address data by 1, and the preset data m is configured as 1 as an example to describe the addressing process as follows. The device address data in the data packet transmitted by the master device can be 0x3 (in hexadecimal), and the device address data in the data packet received by data receiving terminal SDI1 of slave device IC1 can be 0x3. The device address data 0x3 may not match with the preset data m=1, and slave device IC1 can decrease the device address data by 1, and transmit the modified device address data 0x2 to data receiving terminal SDI2 of slave device IC2. The device address data of the data packet received by data receiving terminal SDI2 of slave device IC2 is thus 0x2.

The device address data 0x2 may not match the preset data m=1, and slave device IC2 can decrease the device address data by 1, and transmit the modified device address data 0x1 to data receiving terminal SDI3 of slave device IC3. The device address data of the data packet received by data receiving terminal SDI3 of slave device IC3 is thus 0x1. The device address data 0x1 can match the preset data m=1. Thus, slave device IC3 may determine that the data packet transmitted by the master device is for slave device IC3, and may implement corresponding operation(s) according to the communication data in the received data packet. In one example, when the target slave device is found, this communication may be over. In another example, when the target slave device is found, the data packet may continue to be transmitted and/or can be modified by the slave devices after the target slave device in the communication link, but the subsequent slave devices may not be target slave devices.

The device address data in the data packet transmitted by the master device can be determined by the preset data m, the position of the target slave device, and the calculation method of modifying the device address data in the data packet. For example, the position of the target slave device can correspond to forwarding times of the data packet transmitted by the master device to the target slave device. For example, the calculation method of modifying the device address data by each of slave device IC1 to nth slave device ICn can be to increase the device address data by 1, and the preset data m is 6. If the master device transmits the data packet to slave device IC4, the device address data in the data packet transmitted by the master device is 3. The specific calculation method can be: $p=m-b*(x-1)$, where p is the device address data in the data packet transmitted by the master device, b is an increasing value, x is the position of the target slave, and the specific values are substituted into the aforementioned calculation method: $p=6-1*(4-1)=3$. Similarly, when the calculation method of modifying the device address data by each of slave device IC1 to nth slave device ICn is to decrease the device address data by b, the calculation method of the device address data in the data packet transmitted by the master device may be also obtained as follows: $p=m+b*(x-1)$.

Accordingly, when the calculation method of modifying the device address data by each of slave device IC1 to nth slave device ICn is to increase the device address data by increasing value b, the device address data in the data packet transmitted by the master device can be configured as the difference between the preset data m and a first product, and the first product can be the product of the difference between the position x of the target slave device and 1 and the increasing value b. When the calculation method of modifying the device address data by each of slave device IC1 to nth slave device ICn is to decrease the device address data by decreasing value b, the device address data in the data packet transmitted by the master device is configured as the sum of the preset data m and the first product, and the first product can be the product of the difference between the position x of the target slave device and 1 and the decreasing value b.

The calculation method of modifying the device address data by each of slave device IC1 to nth slave device ICn can be any suitable modification method, and is not limited to increasing or decreasing the device address data in certain embodiments. In another example, the calculation method of modifying the device address data by each of slave device IC1 to nth slave device ICn may adopt shifting the device address data. For example, the calculation method of modifying the device address data by each of slave device IC1 to nth slave device ICn may be a known or an unknown approach of modifying the device address data. A "known" approach may be a set or predetermined modification method, while an "unknown" approach may be a modification method that is selected from a variety of predetermined options or utilizes a randomization protocol or a method that is preprogrammed in the specific device but may not be observable from outside that device.

In particular embodiments, the single wire serial communication system can be in the first type communication mode, whereby the master device transmits the data packet, and the slave device may receive and forwards the data packet to the next slave device in the communication link each communication. Before the data packets are forwarded to the next slave device, the slave device can modify device address data in the data packet received by the slave device. The slave device can compare the device address data in the received data packet against preset data. When the device address data in the received data packet matches the preset data, the slave device can be regarded as the target slave device in the communication and implement corresponding operation(s) according to communication data in the received data packet. The single wire serial communication method and the single wire serial communication system may solve the problem of automatic addressing of single wire serial communication of the plurality of same apparatus, and may not require address initialization, thereby avoiding communication on the latter stage from influencing due to the failure of the address initialization. In addition, the single wire serial communication method and the single wire serial communication system may not be required to transmit the data of all slave devices on the communication link, and the communication efficiency accordingly improved.

Figure 5:
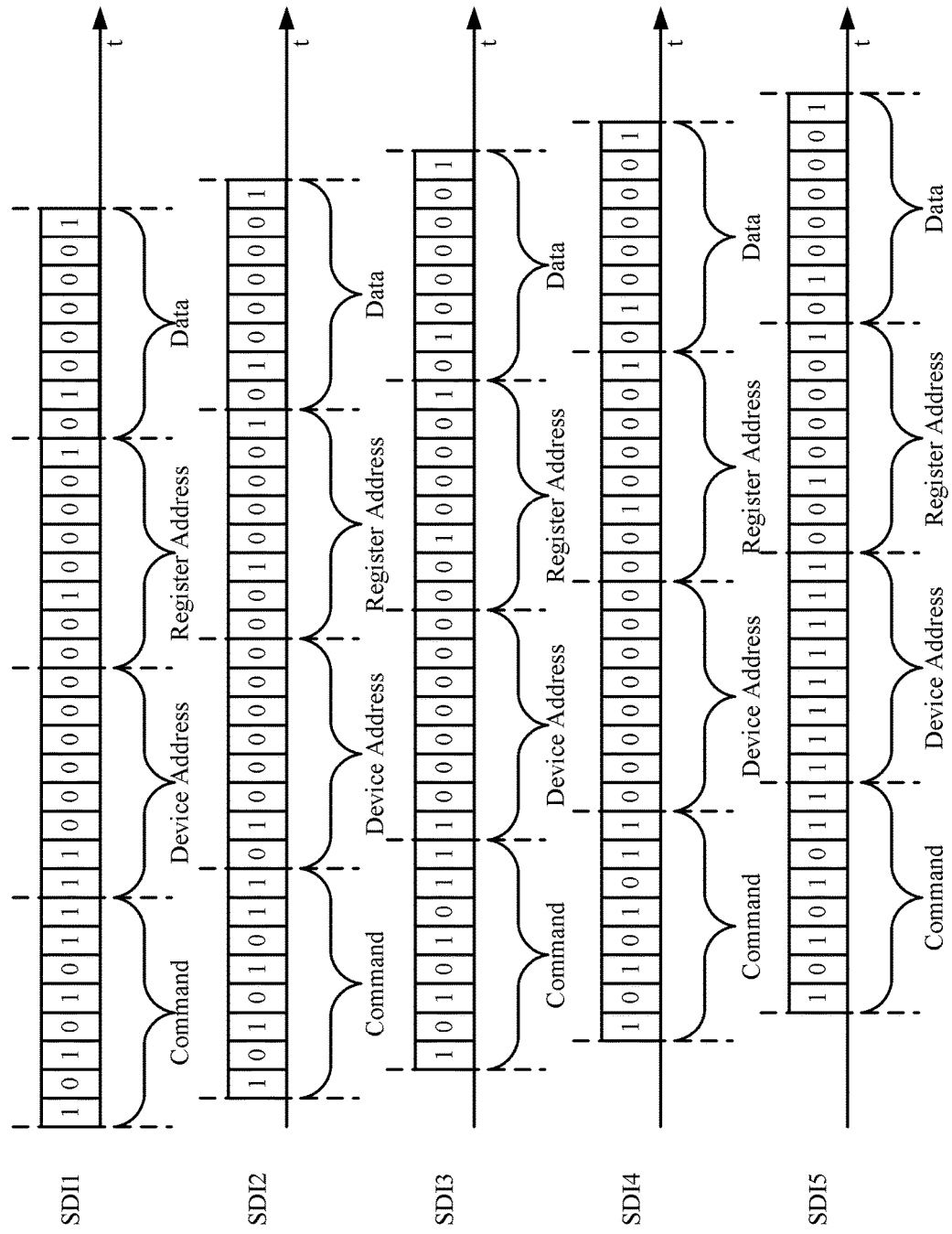
FIG. 5 is a coding diagram of a third example communication data transmission method of a single wire serial communication system, in accordance with embodiments of the present invention.

Referring now to FIG. 5, shown is a coding diagram of a third example communication data transmission method of a single wire serial communication system, in accordance with embodiments of the present invention. The difference between the single wire serial communication method shown in FIG. 5 and the single wire serial communication method shown in FIG. 4 is that the encoding way of the device address data is most significant bit (MSB) first in FIG. 4, and the encoding way of the device address data is least significant bit (LSB) first in FIG. 5.

Because the encoding approach of the device address data is MSB first in the communication data transmission method shown in FIG. 4, when the device address data requires modifying by increasing or decreasing, the calculation of increasing or decreasing the device address data can start after the transmission of the LSB of the device address data completes. If the communication frequency is z Hz, namely, transmitting one bit message takes $1/z$ s, and if the bit of the device address data is y bit, the delay time between the data packet in data receiving terminal SDI and the data packet in data output terminal SDO of each of slave device IC1 to nth slave device ICn is at least $y/z$ s. Because the encoding way of the device address data is LSB first in the communication data transmission method shown in FIG. 5, when the device address data requires modifying by increasing or decreasing, a bit of the device address data can be modified after the bit of the device address data is obtained, such that the delay time between the data packet in data receiving terminal SDI and the data packet in the data output terminal SDO of each of slave device IC1 to nth slave device ICn may at least reach $1/z$ s. Hence, the communication timeliness of the single wire serial communication system can be significantly improved.

Figure 6:
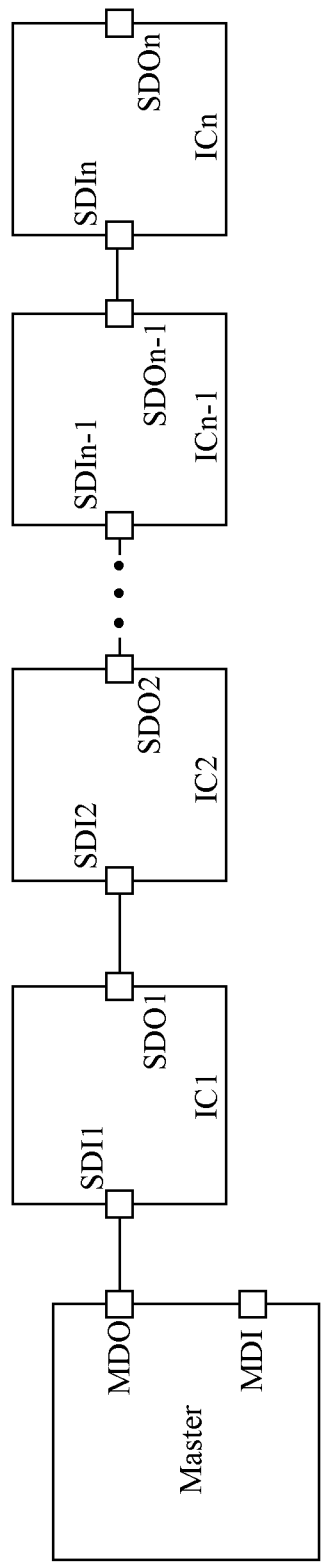
FIG. 6 is a structural diagram of an example single wire serial communication system, in accordance with embodiments of the present invention.

Referring now to FIG. 6, shown is a structural diagram of an example single wire serial communication system, in accordance with embodiments of the present invention. In this example single wire serial communication system, data output terminal MDO of the master device can connect to data receiving terminal SDI1 of slave device IC1, and data receiving terminal SDI2 of slave device IC2 to data receiving terminal SDIn of nth slave device ICn may respectively be connected to data output terminal SDO1 of slave device IC1 to data output terminal SDOn-1 of the (n-1)th slave device ICn-1 in the communication link. Also, data output terminal SDOn of nth slave device ICn may not be connected to the data input terminal MDI of the master device.

As long as the single wire serial communication system can implement unidirectional data transmission, there may be no need to form the circular single wire serial communication system. As such, as long as slave device IC1 to nth slave device ICn can receive the data packet transmitted by the master device, there may be no need to dispose the communication link where the data packet transmitted by slave device IC1 to nth slave device ICn is transmitted to the master device. The first type communication mode and the second type communication mode of the single wire serial communication method in particular embodiments are also applicable herein.

Figure 7:
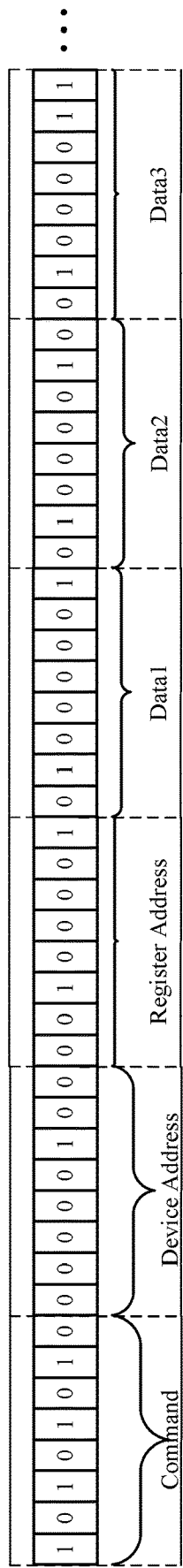
FIG. 7 is a coding diagram of a fourth example communication protocol used in a single wire serial communication system, in accordance with embodiments of the present invention.

Referring now to FIG. 7, shown is a coding diagram of a fourth example communication protocol used in a single wire serial communication system, in accordance with embodiments of the present invention. In this particular example, the data packet transmitted by the master device can include command data, device address data, register address data, and a plurality of communication data Data1-Datan. During the process of forwarding the data packet, the slave device in the first example addresses by modifying the device address data in the data packet in order to match more than one target slave device according to the preset calculation method. Thus, the target slave devices implement corresponding operation according to the corresponding communication data in the data packet. In the example of FIG. 7, an optional encoding way is shown, but any suitable encoding or coding approach, including data of the device address data, of the communication protocol can be utilized in certain embodiments.

In addition to the first type communication mode, the single wire serial communication method can also include a second type communication mode. When the single wire serial communication system is in the second type communication mode, the master device may find the plurality of target slave devices. When the single wire serial communication system is in the second type communication mode, in each communication, the master device can transmit a data packet, and each of the plurality of slave devices IC1-ICn may sequentially receive the data packet. A current slave device may receive the data packet, and Ford the data packet to a next slave device in the communication link. For example, each of the plurality of slave devices IC1-ICn when receiving the data packet may serve as the current slave device. The current slave device can modify device address data in the data packet before the data packet is forwarded to the next slave device. The current slave device can compare the device address data in the data packet received by the current slave device against the device address data transmitted in the data packet by the master device, in order to find more than one target slave device in the communication.

In addition, the current slave device can compare the device address data in the data packet received by the current slave device against the device address data transmitted by the master device, and may determine a position of the current slave device according to a difference between the device address data in the data packet received by the current slave device and the device address data transmitted by the master device. The current slave device can also find corresponding communication data in the data packet transmitted by the master device to implement according to the position of the current slave device. For example, the data packet transmitted by the master device can include a plurality of communication data corresponding to the plurality of slave devices IC1-ICn.

For example, the slave device can compare the device address data in the received data packet against the device address data transmitted by the master device, and may determine the position of the slave device from the difference between the device address data in the received data packet and the device address data transmitted by the master device. The slave device can also find corresponding communication data in the data packet transmitted by the master device to implement according to the position of the slave device. The data packet transmitted by the master device can include the plurality of communication data, e.g., as shown in FIG. 7 corresponding to the plurality of slave devices IC1-ICn. Also, the device address data transmitted by the master device can be a preset fixed value, and the fixed value is determined by the parameters of the plurality of slave devices IC1-ICn.

The single wire serial communication system may determine whether to be in the first type communication mode or the second type communication mode according to the command data in the data packet each communication. For example, when the single wire serial communication system needs to be in the first type communication mode, the command data can be first data. When the single wire serial communication system needs to be in the second type communication mode, the command data can be second data, where the first data are different from the second data. The values of the first data and the second data may not be unique values.

For example, the calculation method of modifying the device address data by each of slave device IC1 to nth slave device ICn can be decreasing the device address data by 1, and the device address data of slave device IC1 to nth slave device ICn are all set as the known device address data 0xFF. Hence, the device address data of the data packet transmitted by the master device is 0xFF, and the device address data of the data packet received by data receiving terminal SDI1 of slave device IC1 can be 0xFF. The difference between the device address data 0xFF received by slave device IC1 and the device address data 0xFF in the data packet transmitted by the master device may thus be 0, and slave device IC1 can find the communication data Data1 from the first part of the communication data in the data packet.

Slave device IC1 may decrease the device address data by 1, and transmit the decremented device address data 0xFE to slave device IC2. The device address data of the data packet received by data receiving terminal SDI2 of slave device IC2 may thus be 0xFE. The difference between the device address data 0xFE received by slave device IC2 and the device address data 0xFF in the data packet transmitted by the master device may thus be 1, and slave device IC2 can find the communication data Data2 from the second part of the communication data in the data packet. Also, slave device IC2 can decrease the device address data by 1 and transmits the decremented device address data 0xFD to slave device IC3. The device address data of the data packet received by data receiving terminal SDI3 of slave device IC3 may thus be 0xFD. The difference between the device address data 0xFD received by slave device IC3 and the device address data 0xFF in the data packet transmitted by the master device may thus be 2, and slave device IC3 can find the communication data Data3 from the third part of the communication data in the data packet, and so on.

The device address data in the data packet transmitted by the master device herein is not limited to 0xFF, and 0xFF is just an example for explanation. The device address data of the data packet transmitted by the master device may be any preset fixed value as long as the device address data of the data packet transmitted by the master device matches the calculation method of modifying the device address data by each of slave device IC1 to nth slave device ICn. The calculation method of modifying the device address data by each of slave device IC1 to nth slave device ICn is not limited to decreasing the device address data by 1, and may be decreasing or increasing the device address data by another fixed value, may be shifting the device address data, or may be decreasing or increasing the device address data by an unfixed value (e.g., the decreasing or increasing values of the plurality of slave devices are proportional in turn in the communication link), etc., in certain embodiments.

In particular embodiments, in the second type communication mode, the master device can find the plurality of target slave devices each communication. The master device can transmit the data packet. The slave device may receive and forward the data packet to the next slave device, and before the data packet is forwarded to the next slave device, the slave device can modify device address data in the data packet. The slave device can compare the device address data in the received data packet against the device address data transmitted by the master device, and can determine the position of the slave device from the difference between the device address data in the received data packet and the device address data transmitted by the master device. The slave device can find corresponding communication data in the data packet transmitted by the master device to implement corresponding operation(s) according to the position of the slave device. The single wire serial communication method and the single wire serial communication system may solve the problem of automatic addressing of the single wire serial communication of the plurality of same apparatus. Also, the single wire serial communication system may only need to transmit the data of all the slave devices on the communication link without the address initialization when being in a one-to-many communication mode, thereby avoiding communication on the latter stage from influencing due to the failure of the address initialization.

In particular embodiments, in the first type communication mode, in each communication, the master device can transmit the data packet, the slave device may receive and forwards the data packet to the next slave device, and before the data packet is forwarded to the next slave device, the slave device can modify device address data in the data packet. The slave device can compare the device address data in the received data packet against a preset data, and when the device address data in the received data packet matches the preset data, the slave device may be regarded as the target slave device in the communication and implements corresponding operation(s) according to communication data. The single wire serial communication method and the single wire serial communication system may solve the problem of automatic addressing of single wire serial communication of the plurality of the same apparatus, and may not require address initialization, thereby avoiding all communication on the latter stage from influencing due to the failure of the address initialization. In addition, the single wire serial communication method and the single wire serial communication system may not require transmitting the data of all slave devices on the communication link, and the communication efficiency can accordingly be improved.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A single wire serial communication method for a single wire serial communication system having a master device and a plurality of slave devices, wherein the master device and the plurality of slave devices are sequentially connected by a single wire, the method comprising:
    a) in each communication, transmitting a data packet by the master device, and sequentially receiving the data packet by each of the plurality of slave devices;
    b) receiving the data packet and forwarding the data packet to a next slave device by a current slave device, wherein each of the plurality of slave devices when receiving the data packet serve as the current slave device;
    c) before the data packet is forwarded to the next slave device, modifying device address data in the data packet by the current slave device; and
    d) comparing the device address data in the data packet received by the current slave device against a preset data or the device address data in the data packet transmitted by the master device, in order to find at least one target slave device in the communication.

2. The method of claim 1, wherein when the single wire serial communication system is in a first type communication mode, the method further comprises:
    a) comparing the device address data in the data packet received by the current slave device against the preset data by the current slave device; and
    b) when the device address data in the data packet received by the current slave device matches the preset data, regarding the current slave device as the target slave device in the communication and implementing a corresponding operation according to communication data in the data packet by the target slave device.

3. The method of claim 2, wherein when the preset data and a calculation method of modifying the device address data in the data packet are determined, the device address data in the data packet transmitted by the master device is set such that the device address data in the data packet transmitted by the master device corresponds to each of the plurality of slave devices.

4. The method of claim 2, wherein the device address data in the data packet transmitted by the master device is determined by the preset data, a position of the target slave device, and a calculation method of modifying the device address data in the data packet, and wherein the position of the target slave device corresponds to forwarding times of the data packet transmitted by the master device to the target slave device.

5. The method of claim 4, wherein the calculation method of modifying the device address data in the data packet comprises at least one of increasing, decreasing, or shifting the device address data in the data packet.

6. The method of claim 5, wherein:
    a) when the calculation method of modifying the device address data in the data packet is to add an increasing value to the device address data in the data packet, the device address data in the data packet transmitted by the master device is configured as a difference between the preset data and a first product, and the first product is a product of a difference between the position of the target slave device and 1 and the increasing value; and b) when the calculation method of modifying the device address data in the data packet is to decrease the device address data in the data packet by a decreasing value, the device address data in the data packet transmitted by the master device is configured as a sum of the preset data and a first product, and the first product is a product of a difference between the position of the target slave device and 1 and the decreasing value.

7. The method of claim 1, wherein an encoding way of the device address data is LSB first.

8. The method of claim 1, wherein the preset data in the slave device is set as a fixed value.

9. The method of claim 1, wherein when the single wire serial communication system is in a second type communication mode, the method further comprises:
   a) comparing the device address data in the data packet received by the current slave device against the device address data transmitted by the master device;
   b) determining a position of the current slave device according to a difference between the device address data in the data packet received by the current slave device and the device address data transmitted by the master device; and
   c) finding corresponding communication data in the data packet transmitted by the master device to implement by the current slave device according to the position of the current slave device, wherein the data packet transmitted by the master device comprises a plurality of communication data corresponding to the plurality of slave devices.

10. The method of claim 9, wherein the device address data transmitted by the master device is a preset fixed value, and the fixed value is determined by parameters of the plurality of slave devices.

11. A single wire serial communication system having a master device and a plurality of slave devices, wherein the master device and the plurality of slave devices are sequentially connected by a single wire to form a communication link, the system comprising:
   a) wherein in each communication, the master device transmits a data packet, and each of the plurality of slave devices sequentially receives the data packet;
   b) wherein a current slave device receives the data packet and forwards the data packet to a next slave device in the communication link, wherein each of the plurality of slave devices when receiving the data packet serves as the current slave device;
   c) wherein before the data packet is forwarded to the next slave device, the current slave device modifies device address data in the data packet; and
   d) wherein the current slave device compares the device address data in the data packet received by the current slave device against a preset data or the device address data transmitted in the data packet by the master device in order to find at least one target slave device in the communication.

12. The system of claim 11, wherein a calculation method of modifying the device address data in the data packet comprises at least one of increasing, decreasing, or shifting the device address data in the data packet.

13. The system of claim 11, wherein when the single wire serial communication system is in a first type communication mode, the current slave device compares the device address data in the data packet received by the current slave device against the preset data, and when the device address data in the data packet received by the current slave device matches the preset data, the current slave device is regarded as the target slave device in the communication and implements corresponding operation according to communication data in the data packet.

14. The system of claim 13, wherein the device address data in the data packet transmitted by the master device is determined by the preset data, a position of the target slave device and a calculation method of modifying the device address data in the data packet, and the position of the target slave device corresponds to forwarding times of the data packet transmitted by the master device to the target slave device.

15. The system of claim 14, wherein:
   a) when the calculation method of modifying the device address data in the data packet is to add an increasing value to the device address data in the data packet, the device address data in the data packet transmitted by the master device is configured as a difference between the preset data and a first product, and the first product is a product of a difference between the position of the target slave device and 1 and the increasing value; and
   b) when the calculation method of modifying the device address data in the data packet is to decrease the device address data in the data packet by a decreasing value, the device address data in the data packet transmitted by the master device is configured as a sum of the preset data and a first product, and the first product is a product of a difference between the position of the target slave device and 1 and the decreasing value.

16. The system of claim 11, wherein the preset data in the slave device is set as a fixed value.

17. The system of claim 11, wherein:
   a) when the single wire serial communication system is in a second type communication mode, the current slave device compares the device address data in the data packet received by the current slave device against the device address data transmitted by the master device;
   b) the current slave device determines a position of the current slave device according to a difference between the device address data in the data packet received by the current slave device and the device address data transmitted by the master device; and
   c) the current slave device finds corresponding communication data in the data packet transmitted by the master device to implement according to the position of the current slave device, wherein the data packet transmitted by the master device comprises a plurality of communication data corresponding to the plurality of slave devices.

18. The system of claim 17, wherein the device address data transmitted by the master device is a preset fixed value, and the fixed value is determined by parameters of the plurality of slave devices.

19. The system of claim 11, wherein an encoding way of the device address data is LSB first.

20. The system of claim 11, wherein:
   a) the plurality of slave devices in the communication link comprises a first slave device, a second slave device, through an (N−1)th slave device and an Nth slave device, wherein N is a positive integer;
   b) a data output terminal of the master device is connected to a data receiving terminal of the first slave device;

c) data receiving terminals of a second slave device to the Nth slave device are respectively connected to data output terminals of the first slave device to the (N−1)th slave device in the communication link; and
d) the first slave device to the Nth slave device are instances of a same apparatus.

* * * * *